(12) United States Patent
Barker

(10) Patent No.: US 8,311,972 B2
(45) Date of Patent: Nov. 13, 2012

(54) METHOD OF BUILDING A DATA INTEGRATION ENVIRONMENT

(75) Inventor: Sean Michael Barker, Bristol (GB)

(73) Assignee: BAE SYSTEMS plc, London (GB)

( * ) Notice: Subject to any disclaimer, the term of this patent is extended or adjusted under 35 U.S.C. 154(b) by 509 days.

(21) Appl. No.: 12/447,980

(22) PCT Filed: Oct. 31, 2007

(86) PCT No.: PCT/GB2007/050665
§ 371 (c)(1),
(2), (4) Date: Aug. 11, 2009

(87) PCT Pub. No.: WO2008/053249
PCT Pub. Date: May 8, 2008

(65) Prior Publication Data
US 2010/0070450 A1    Mar. 18, 2010

(30) Foreign Application Priority Data

Nov. 2, 2006 (EP) .................................. 06270092.7
Nov. 2, 2006 (GB) .................................. 0621800.2

(51) Int. Cl.
*G06F 17/00* (2006.01)
*G06N 7/00* (2006.01)
*G06N 7/08* (2006.01)
(52) U.S. Cl. ......................................................... 706/55
(58) Field of Classification Search ................ 706/55, 706/47, 62
See application file for complete search history.

(56) References Cited

U.S. PATENT DOCUMENTS
2006/0198346 A1* 9/2006 Liu et al. ...................... 370/338

FOREIGN PATENT DOCUMENTS
EP     1 684 192     7/2006

OTHER PUBLICATIONS

Keeney et al, "Chisel: A Policy-Driven, Context-Aware, Dynamic Adaptation Framework", IEEE, Proceedings of the 4th International Workshop on Policies for Distributed Systems and Networks, 2003, (Policy 2003).*
Bracka et al, "Trajectory based communication in an ad hoc network of robots", International Conference on Wireless and Mobile Computing, Networking and Communications, 2005, (WiMob'2005), IEEE.*

(Continued)

*Primary Examiner* — David Vincent
*Assistant Examiner* — Ilya Traktovenko
(74) *Attorney, Agent, or Firm* — Pillsbury Winthrop Shaw Pittman LLP

(57) ABSTRACT

A method of building a data integration environment is provided. According to one embodiment of the invention as applied to a computer network, the method comprising: identifying the data integration environment and the policies that apply to it 200, negotiating with the environment 202, and generating a new interface rule set enabling information to be passed in dependence thereon between the system which is made part of the integration environment and the integration environment. The method can be usefully applied in UAV networks, robot networks as well as in networks of fixed sensors. The invention finds utility in various important applications such as in network-enabled capability and in rapid integration of systems.

12 Claims, 11 Drawing Sheets

OTHER PUBLICATIONS

Doumit et al, "Self-organizing and Energy-efficient Network of Sensors", MILCOM 2002 Proceedings, p. 1245-1250 vol. 2, Oct. 7-10, 2002, ISBN: 0-7803-7625-0, Current Version: Feb. 25, 2003.*

International Preliminary Report on Patentability for PCT International Application No. PCT/GB2007/050665, mailed on May 5, 2009.

European Search Report issued in EP 06270092.7, Apr. 2, 2007, 10 pages.

Vouros et al., "Extending HCONE-Merge by Approximating the Intended Meaning of Ontology Concepts Iteratively", Proceedings of Second European Semantic Web Conference, Jun. 2005, pp. 198-210.

N. F. Noy, "Tools for Mapping and Merging Ontologies", Handbook on Ontologies, Springer, Heidelberg, Germany, Jan. 2004, pp. 365-384.

Dou et al., "Ontology Translation by Ontology Merging and Automated Reasoning", Proceedings of EKAW Workshop on Ontologies for Multi-Agent Systems, 2002, 19 pages.

Mitra et al., "A Scalable Framework for the Interoperation of Information Sources", Proceedings of the $1^{st}$ International Semantic Web Working Symposium, Jul. 2001, 14 pages.

Corcho et al., "Evaluating Knowledge Representation and Reasoning Capabilities of Ontology Specification Languages", Proceedings of ECAI-00 Workshop o Applications of Ontologies and Problem-Solving Methods, Aug. 2000, 9 pages.

* cited by examiner

Activity with Dates

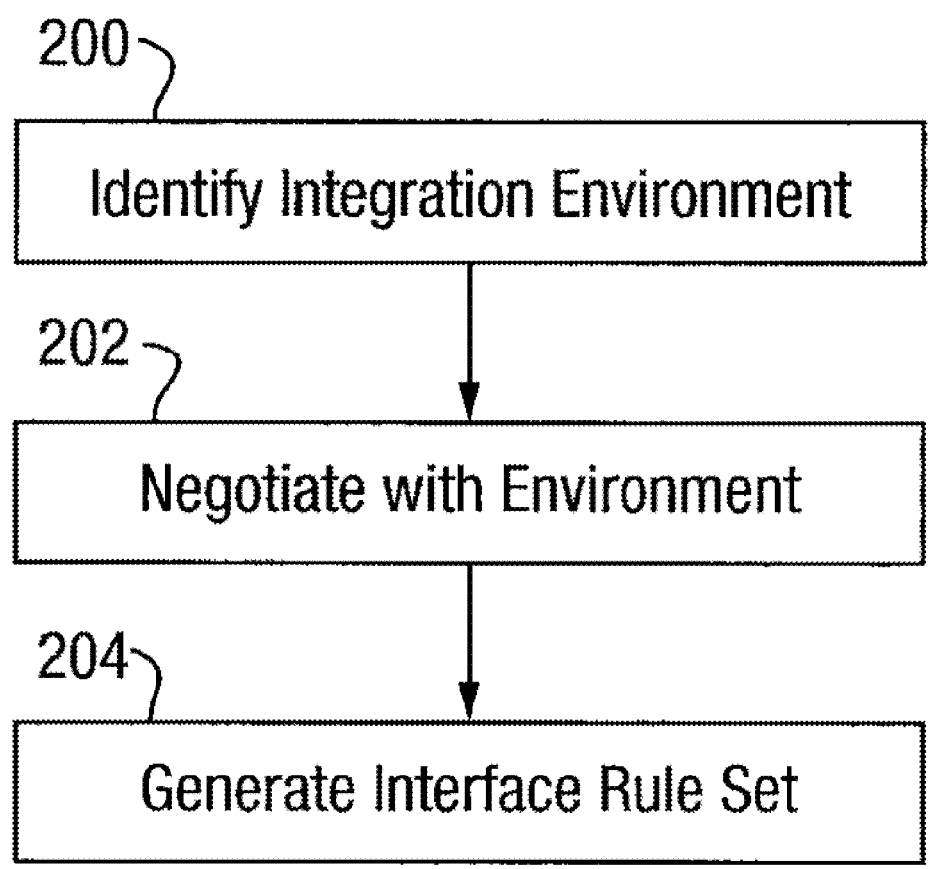

Activity with Associated Dates

Activity Subtypes with Dates

Example User System Data Model

Example Integration Model

Supply Chain Example

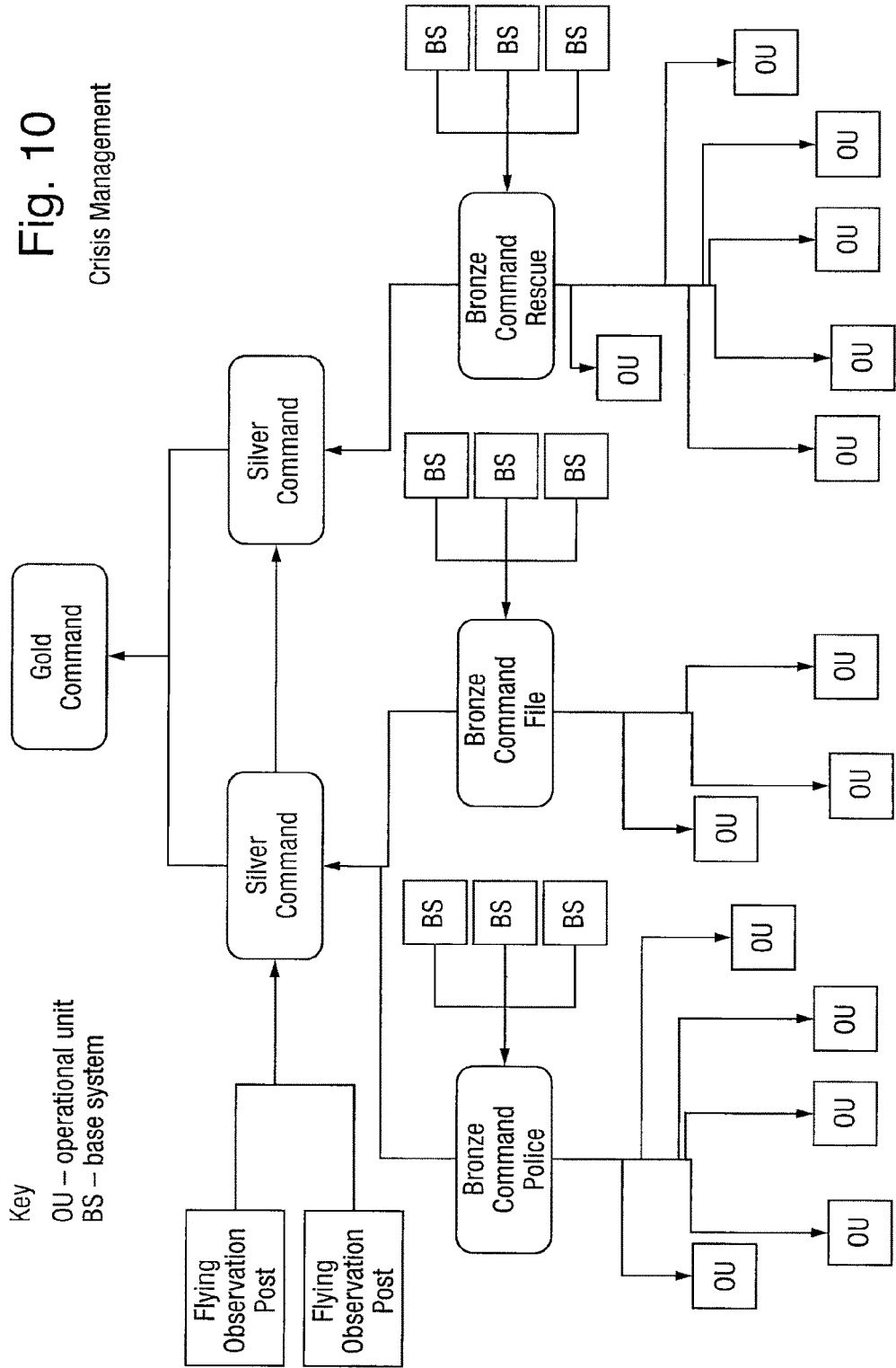

METHOD OF BUILDING A DATA INTEGRATION ENVIRONMENT

CROSS REFERENCE TO RELATED APPLICATIONS

This is the U.S. National Phase of PCT/GB2007/050665, filed Oct. 31, 2007, which claims priority to British Application No. 0621800.2, filed Nov. 2, 2006, and European Application No. 06270092.7, filed Nov. 2, 2006, the entire content of all of which are incorporated herein by reference.

FIELD OF THE INVENTION

This invention concerns a method of building a data integration environment. More particularly, but not exclusively, the invention concerns a method of rapidly building a data integration environment in which the personnel of two or more organizations are enabled to work together through their information systems being able to process the information of other organizations having regard to the meaning of the information so processed.

BACKGROUND OF THE INVENTION

Information Integration

All computer-based applications embed a model of the real world, in which the concepts of the users are modelled as a system of data (the static model) together with computational behaviours which enable new facts to be deduced (the dynamic model). The behaviours allowed on the information are restricted by the real world meaning of the information. For example, it is valid to add the costs of line items of an invoice to calculate the total cost, whereas it is not valid to add the ages of a set of people to calculate "the age of a department".

Information integration is concerned with transferring information using the data model (the static model), so that the receiving system can apply the correct computational behaviours (the correct dynamic model). This means that the facts deduced are correctly understood by the users. For example, when a 3-D CAD model is transferred from a designer to a manufacturer, the manufacturer can make the part required.

Information integration is different from display integration, in which end users use their own application to read another's information. Display integration does not allow the information applications to deduce new facts, only to display existing facts. The first generations of the World Wide Web allowed people to display information from anywhere in the world, but it was not possible for the Web Browser to calculate anything from that information.

This invention enables information integration, rather than display integration.

Information Integration Standards

Information integration between organizations has historically been based on a stack of information standards, including the following, in computer-based systems:—

A data encoding standard, such as ASCII or Unicode, which defines the alphabet used when transferring data.

A syntactic standard, which identifies the "words" of the exchange and their syntax, such as the STEP part 21 (ISO 10303-21) for file exchange or XML for transfer via a web server.

The semantic standard, which defines what each data element means, such as the STEP application protocols (ISO 10303-201 to 299), or an XML schema. For example, in an entity address it will identify the field country as holding that part of the address which states the name of the country.

Reference data standards, such as the standard lists of abbreviations for countries, whose elements may form part of the content of an exchange.

In general, each standard is independent of each other, so one standard in the stack can be replaced with an equivalent without needing to replace the others above and below it.

Standards developed by computer oriented groups (e.g. computer manufacturers) focus on syntactic standards, since these enable any user to transfer information between software systems. However, in order to work together, end users need semantic standards and reference data, since they require to understand what the data means. By analogy, a telephone company may be proud that its system allows a user to ring up someone in China, whereas that user would like to be able to understand the person that user is talking to.

This invention enables the integration at the level of semantic standards, and does not rely on the use of any particular syntactic or data encoding standard.

Hierarchical Systems of Reference Data

The simplest known form of hierarchy is the tree, which is a form of directed graph. In mathematical theory, a graph is a set of nodes, with lines connecting the nodes. In a directed graph, the connecting lines have an associated direction, from one node to another. In a tree, there is a single node—the root node—which has no line going in to it, although it has several going out. All other nodes have exactly one line going in, and zero or more going out. The nodes which have no lines going out are called leaf nodes. A consequence of these constraints is that the tree appears to branch out from the root, and there is a path from the root to every leaf. By convention, the root is shown at the top of the diagram. An alternative naming convention has the node at the start of the line called the parent, and the node at the end called the child. In a tree, every node except the root has exactly one parent, and may have multiple children. The root is the ancestor of every node.

A hierarchy can be viewed as the merger of multiple trees. It therefore can have multiple roots, and a node can have multiple parents. However, the rules of a hierarchy forbid looping back, so that no node can be a parent of a node above it in the hierarchy (if it could, it could potentially be its own ancestor).

In a reference data hierarchy, the nodes carry terms, and the connecting lines indicate a subclass relationship, so that the child node is always a subclass of its parent. That is, any valid deduction (or computational behaviour) applicable to the parent is also applicable to the node itself. For example, if a car is defined as a "self propelled land vehicle capable of carrying passengers", and it is asserted that a mini is a type of car, then it can be deduced that a mini is a "self propelled land vehicle capable of carrying passengers". Hence, to understand a node, one needs not to have prior knowledge of the existence of the node, but instead one only needs to be given the name of the subclass and its parentage, and then it is possible to use the subclass effectively. This is also called inheritance, in which the child node inherits the properties of the parent nodes.

A formalization of this concept in the world of Artificial Intelligence is the ontology. Although this technique and the supporting tools provide a useful basis for implementation, it is to be appreciated that this formalism is not an intrinsic part of the invention.

Historical Experience with Information Integration

Information integration is generally a two step process. The first step is to agree a common semantic information model. The second step is to implement the model.

Historically, as the first step, the entire semantic model—the data model and the reference data—has had to be completely agreed for meaningful integration to take place. Anything outside this agreement has had to have been ignored by participating systems. The second step then takes several months typically as the required software is implemented and tested, and complex exchanges can take more than a year's testing typically before they can be used in production.

For the purposes of this specification, the term "integration" refers to implementation through a data exchange, transaction or data sharing mechanism. In a data exchange mechanism, data integration occurs through the transfer of a complete package of information, for example the sending of an electronic maintenance manual. In a transaction mechanism, data integration occurs through the transfer of a (coherent) subset of the information, for example updating of a maintenance manual by sending the new estimated manhours for a task. In data sharing, multiple application read and update a single source of data, such as a database. The invention is applicable to all such methods of implementation.

The latest generation of standards has used new technologies to allow the reference data to be structured hierarchically. In the first step of integration, the whole semantic data and the upper levels of the reference data hierarchy must be agreed in advance. The details of the subclasses of the reference data can be deferred until later, allowing the implementation to start before the reference data is complete. However, the reference data must be complete for the final stages of software implementation and testing to go ahead.

In the invention, only the framework of the semantic data model and the upper levels of the reference data hierarchy must be agreed in advance. The invention enables the extension of the semantic data model and the reference data hierarchy and the addition of new computational behaviours after software implementation has been completed, because the software reconfigures itself to deal with the extended functionality.

Historically, once the semantic data model and reference data have been agreed and the software implemented, any change to the semantic data model requires every implementation to be updated. In practice, the reimplementation phase can take several months. Consequently, unless all the parties are running exactly the same integration interface with the same versions of the semantic standard, it can take typically several months (or more) to create a new data integration environment, and several months preparation to update the environment.

In the latest generation of standards, the implementation of the semantic data model is independent of that of the reference data model. This means that in step two, although the initial implementation takes as long as before, provided the semantic data model is unchanged, changes to the reference data library can be made rapidly (within hours). Further, provided only one party extends the reference data, it has been acknowledged that by subtyping reference data, it becomes possible to extend automatically the scope of the data exchange process.

This invention takes the above described two stages further. First, the implementation step allows limited automatic extension of the semantic data model, the behaviours and the reference data. Secondly, the invention allows automatic negotiation of the scope of the exchange where changes are made by more than one party. That is, one particular benefit of the invention over known applications is that the set up time for the integration environment may be significantly reduced from months to minutes. Another particular benefit of the invention is that the updating of the integration environment can be done incrementally with parties changing at different times.

Data Models v. Instances

A data model is a description of the types of data a system may hold. For example, a date may have a three character field for the month. An instance of date may have the value 'May' in the month field. A system will generally have many instances of date.

In general, the data model is expressed as part of the software in a system, whereas the instances are the values held by the system in its data files or database.

The reader unfamiliar with data modelling should keep this distinction in mind, particularly since, although all systems operate on instances, by convention, the types of operation are described in terms of the data model.

BACKGROUND ART

The use of a stack of data exchange standards, including a semantic data model, has been established since at least the 1980's in data exchange standards such as STEP (ISO 10303).

The use of reference data to extend the concepts defined in a data exchange has been established since at least the 1990's by Epistle (ISO 15926).

The combination of a semantic data standard with a hierarchical system of reference data has been established at least since 2004 by the PLCS standard: see ISO 10303-239 for the semantic data model, and http://www.oasis-open.org/apps/org/workgroup/plcs for the use of reference data. PLCS uses the semantic web technology OWL to define its reference data as an ontology.

The use of automatic negotiation by software agents has been known since the 1990's.

The ability to add new tables to a database is a standard feature of SQL; however, SQL is a syntactic standard, and so no real world meaning can be directly attached to the tables and columns so created until the database software is rewritten.

The use of data model patterns as the basis for constructing data models was demonstrated by Matthew West in the 1990's. The data models built from reusable fragments was demonstrated in the STEP environment from c. 2000 onwards. The approach of adding attributes through user guidance has been established in PLCS since 2003. The use of pattern ontologies to classify alternate data patterns and translate between them was demonstrated in the OFFA project by the patent applicant BAE SYSTEMS and by Rolls-Royce in 2003.

OBJECTS AND SUMMARY OF THE INVENTION

It is an object of the present invention to provide a method of building an information infrastructure and creating the possibility of agile partnering.

As will be described hereinafter, it is a feature of the invention to provide means of allowing disparate systems to interoperate through the negotiation of their interchange data model. This is cleverly achieved by means of combining a sequence of innovative technologies, including modular data models and data model patterns, ontologies, agent negotiation and Artificial Intelligence techniques so as to allow systems to grow new functionality. It is to be appreciated that this new functionality is semantics-based, rather than label based, which means that the data is understood by the operational systems and their users, rather than being "dead" data until the system can be upgraded.

In broad terms, the present invention resides in the concept of cleverly recasting attribute statements as rules using technical means, which can then be operated by rule-based systems, and in turn new attributes can be added using new rules. This innovative approach is combined with anchoring the data model in a hierarchical ontology enabling the inheritance of meaning from the parent concepts, be they entities, attribute roles or attribute patterns. In contrast, in established data modelling techniques the list of attributes for a given entity is fixed into the model, thus any change to the attributes requires a change to the model. Thus, whereas in traditional approaches existing interfaces have to be rewritten to correspond to the new version of the data model, the invention allows for the data model to be suitably extended by associating particular attributes to particular framework concepts in particular attribute roles.

According to a first aspect of the invention, there is provided in a collection of enterprises which uses a data communication system network comprising a plurality of data communication systems, a method of building a data integration environment, the method comprising the steps of: (a) establishing a predetermined set of rules about data based upon a data framework, a set of hierarchical classification (or ontology) rules and attribute rules for each system of the network; (b) replicating at least one set of rules representative of one of the systems and transferring said replicated set of rules to one or more other said systems of the network; (c) merging the rules about the data associated with the systems in accordance with a predetermined negotiation procedure based upon processing capability of the systems, enabling a common rules set to be negotiated between the integration environment and the systems; (d) loading the merged rules into the integration environment rule base and selectively populating the datastore implementing the data integration environment with rules data from one or more of the systems; and (e) effecting data exchange between one or more of said systems and the integration environment in accordance with the newly-established rule set. Step (a) of the method advantageously permits differences between the systems to be easily established and the models in question can be maintained at reasonable cost. Step (c) conveniently permits the merged rule set to be established automatically, rather than by manual intervention. Conveniently, Step (e) confers the tangible benefit of rapid implementation of integration and this means that the method can be implemented/maintained at reasonable cost. The possibility of human-related error in creating the data integration environment is thus also significantly reduced.

Optionally, the method includes a step of linking the attribute rules to the hierarchical classification rules in such a way as to permit the set of rules to be used to define the meaning of attributes, the form of attributes and/or the use of attributes. This gives the benefit of applying the technology of negotiation to multiple data systems without the requirement to convert existing data definition approaches (e.g. based on data models or relational database principles) into rule based systems, thereby obviating the need to rewrite existing software.

Optionally, in the method the hierarchical classification rules are used by means of their hierarchical structure to define the meaning of attribute rules particular to one or more of said systems, which attribute rules describe attribute types, attribute values and/or a combination of attribute types and attribute values. This allows for incremental change to the data integration environment, without the need to reconfigure all elements simultaneously. It also allows for a single system to participate in multiple data integration environments of a similar scope, and therefore adapt to changes to any one environment without the need to force change on all the other environments.

Optionally, in the method the hierarchical classification rules are used by means of their hierarchical structure to define the meaning of behaviour rules particular to one or more of said systems, which behaviour rules are used with the attribute types, the attribute values and/or a combination of the attribute types and the attribute values.

According to a second aspect of the invention, there is provided a method of building an agile data model comprising the steps of: (a) establishing a framework data model representation of a set of states, each one of the states being associated with a concept variable describing the model; (b) establishing a set of states corresponding to attributes and attribute roles which are applicable to the model; (c) defining a hierarchical classification of states corresponding to the concept variables of (a), the attributes and the attribute roles; and (d) constructing said data model based upon the established set of states of aforesaid steps (a), (b) and (c), and by creating therefrom a set of rules which associate particular attributes to particular framework concepts in particular attribute roles.

Thus, this inventive method has the benefit of providing an effective communication mechanism between those building the data models, which defines the areas in which different approaches to the model can be negotiated. It has the additional benefit that changes to the model are rapid and can be implemented cost effectively—for example, adding an attribute to the model would require that a new rule is added, which typically takes less than five minutes, as compared with an hour to half a day (depending typically on the modelling methods used) which is typical for a known ISO 10303 model.

The invention extends to a computer program comprising program code means for performing the method steps described above when the program is run on a computer. The invention further extends to a computer program product comprising program code means stored on a computer readable medium for performing the method steps described above when the program is run on a computer.

The present invention is well adapted for use in a network comprising a large number of computers that may wish to communicate and exchange data with each other. Advantageously, the method of the invention can be usefully applied in UAV networks, robot networks as well as in networks of fixed sensors. In this connection, the method of the invention allows for the addition of new UAVs, new robots and/or new sensors to the network, and the upgrading (if desired) of existing UAVs, robots, sensors without the need to reconfigure the network in question. It is noted that the method of the invention as applied to a robot network allows new robots to accept information rapidly from the network and thereby allows robots to cooperate effectively with other robots in the network. It is also noted that the method of the invention as applied to a network of fixed sensors allows existing sensors to continue to operate, even in the case where they must rely on using an interface that is obsolete.

It is to be appreciated that the invention finds utility in various important applications, for example in network-enabled capability and rapid integration of systems (both in terms of deploying operational platforms and in terms of building virtual, agile enterprises that are needed to bring them to market quickly and cheaply).

The above and further features of the invention are set forth with particularity in the appended claims and will be described hereinafter with reference to the accompanying drawings.

BRIEF DESCRIPTION OF THE DRAWINGS

FIG. 2a illustrates schematically steps preformed by the inventive tool in accordance with an embodiment of the invention;

FIG. 10 shows schematically an example of use of the present invention in crisis management.

DESCRIPTION OF THE PREFERRED EMBODIMENTS

Figure 1:
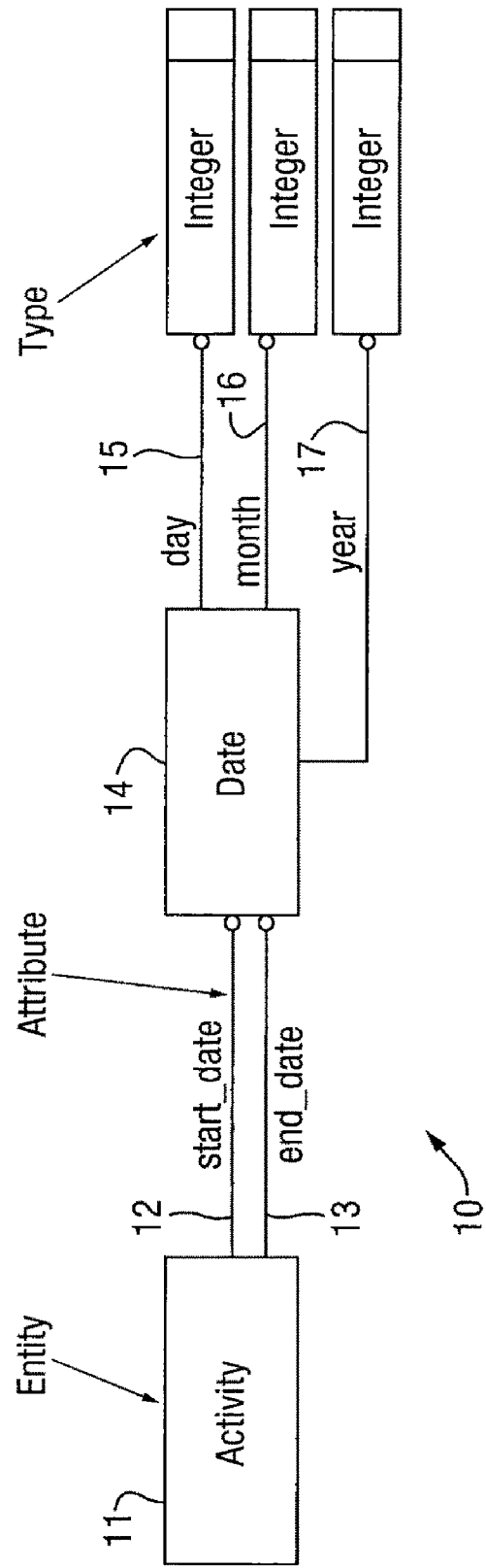
FIG. 1 illustrates schematically an example of a conventional data model.

For the purposes of this specification, the following definition of terms applies:—

Enterprise—this means a purposeful or industrious undertaking in the area enterprise integration.

Enterprise is frequently distinguished from a business in the sense that an enterprise is a collection of resources oriented to a particular product (where a product is the thing delivered, such as sheet steel or car body, as opposed to end-product, such as a car or ship). In contrast, a business is a single legal entity, usually with a particular ownership model. The following terms used in this specification are further required to be distinguished:—

Extended enterprise—this means an enterprise spread across several businesses which uses a homogeneous set of software systems.

Virtual enterprise—this means an enterprise spread across several businesses with interoperating (but heterogeneous) software systems.

Agile business—this means a business which can rapidly join a virtual enterprise.

Agile enterprise—this means an enterprise which can adapt rapidly to a change of membership in the underlying businesses.

Fractal business—this means a single business constructed of several smaller independent enterprises.

As will be appreciated, this invention is aimed at creating a data integration environment applicable to a set of resources which need to interoperate with each other despite having heterogeneous software, be they distinct resources in a single business, multiple businesses, across a single enterprise or across multiple enterprises. In this specification, the term "collection of enterprises" is used to mean a collection of one or more enterprises at any level of granularity.

The term "data integration environment" is a view of a collection of enterprises which focuses on the ability to share and exchange data between the component enterprises so that they can work together (that is, so that the computers can intercommunicate, the software systems can interoperate and the people can interwork). Note that the term view is used here because the resources used in the data integration environment may not be exclusively dedicated to that use.

The term "agile data model" is used to mean a data model which can rapidly be reconfigured, such that the changed functionality of the model can, to a greater or lesser degree, be made immediately available to the using systems. This is to be contrasted with a brittle data model in which any change in the model must be incorporated in all participating systems before its use can continue, and with a flexible data model in which participating systems can continue to operate against the revised model, but without being able to interoperate with the changed functionality.

In the following description, an overview of the invention will be first provided. Thereafter, a detailed explanation will be given of how the invention can be performed in various ways, and by way of example only, embodiments thereof will be described with reference made to the accompanying drawings.

The Invention: Overview

The inventive system for integration must be initially built using a framework data model and the upper ontology (or other hierarchical system) of reference data. The system includes a rules base and the computational behaviours required.

The framework data model consists of an set of entities that the model is to represent, together with the data models for the attributes that can be applied to the entities. The upper ontology consists of root classes corresponding to each of the entities, to each of the attributes, and to each of the uses of the attributes.

For the inventive system to instantiate a particular data model, that is, to support a particular user requirement, the full semantic data model must be defined. This is done by applying attributes to the framework model. For example, the system could represent a part of some product as having a predicted weight. In this example, the rule base contains a rule that the entity part has an attribute weight_property (a subclass of property) in the role of predicted_weight. The system also has a behavioural rule that an assembly of parts may have any single weight_property added together, so that the predicted_weight of an assembly can be calculated.

According to one embodiment of the invention with reference to FIG. 2a, when the system is made part of a data integration environment, it follows three steps. The first step 200 identifies the data integration environment, and the policies that apply to it. The second step 202 negotiates with the environment, confirming that the framework and upper ontologies match, and then negotiating the common rule set. In this embodiment, the hierarchical structure of the reference data is used to identify where new types of data sit in the overall data structure. This has the desired effect of generating a new interface rule set. The third step 204 loads the merged rules into the integration environment rule base and then populates the data store implementing the integration data environment with data from the various systems. Information then passes between the system and the integration environment according to the interface rule set. Additions to the main rule base allow the system to act on data not previously part of the system. For example, a rule may be added that the entity part has a new attribute weight property in the role of measured weight (not shown in FIG. 2a). This means that the behavioural rule for weight property can then be used to find the measured weight of an assembly.

Framework Data Model

Model Representation and Instantiation

A data model is a static model of the user concepts that are applicable in a system. For example, if a system records the list of parts in stock, then it will have, at the very least, a data model consisting of the entity part with attributes part_number and quantity_in_stock.

In computing, there are a number of technologies and methods for defining a data model. The technologies include entity-relationship (ER) modelling, enhanced entity-relationship modelling (EER) and object modelling. The methods for recording a data model include IDEF1x, EXPRESS (ISO 10303-11) and UML (Universal Modelling Language). The description of the invention uses the EER modelling language EXPRESS, and its associated diagramming language, EXPRESS-G; however, this invention is not dependent on any particular modelling technology or method.

In computing, there are a number of ways of declaring or instantiating a data model in a program, including arrays, records, lists, networks, tables (including database tables) and objects. This description is given in terms of tables of records—however, it is to be appreciated that the invention does not rely on any particular way of instantiating the data model.

The Framework Model

In a framework data model, the fundamental users concepts are represented, together with the relationships between them. However, unlike a conventional data model, not all of the attributes of the entities are represented explicitly. It is these additional attributes that can be negotiated, and are therefore the basis of rapid integration. For example, in a conventional data model 10 as shown in FIG. 1 an Activity 11 will have attributes start_date 12 and end_date 13 but for a framework data model, these attributes are not modelled as part of Activity. Note that in the conventional model 10, to instantiate a Date 14, values must be set for day 15, month 16, and year 17.

Figure 2:
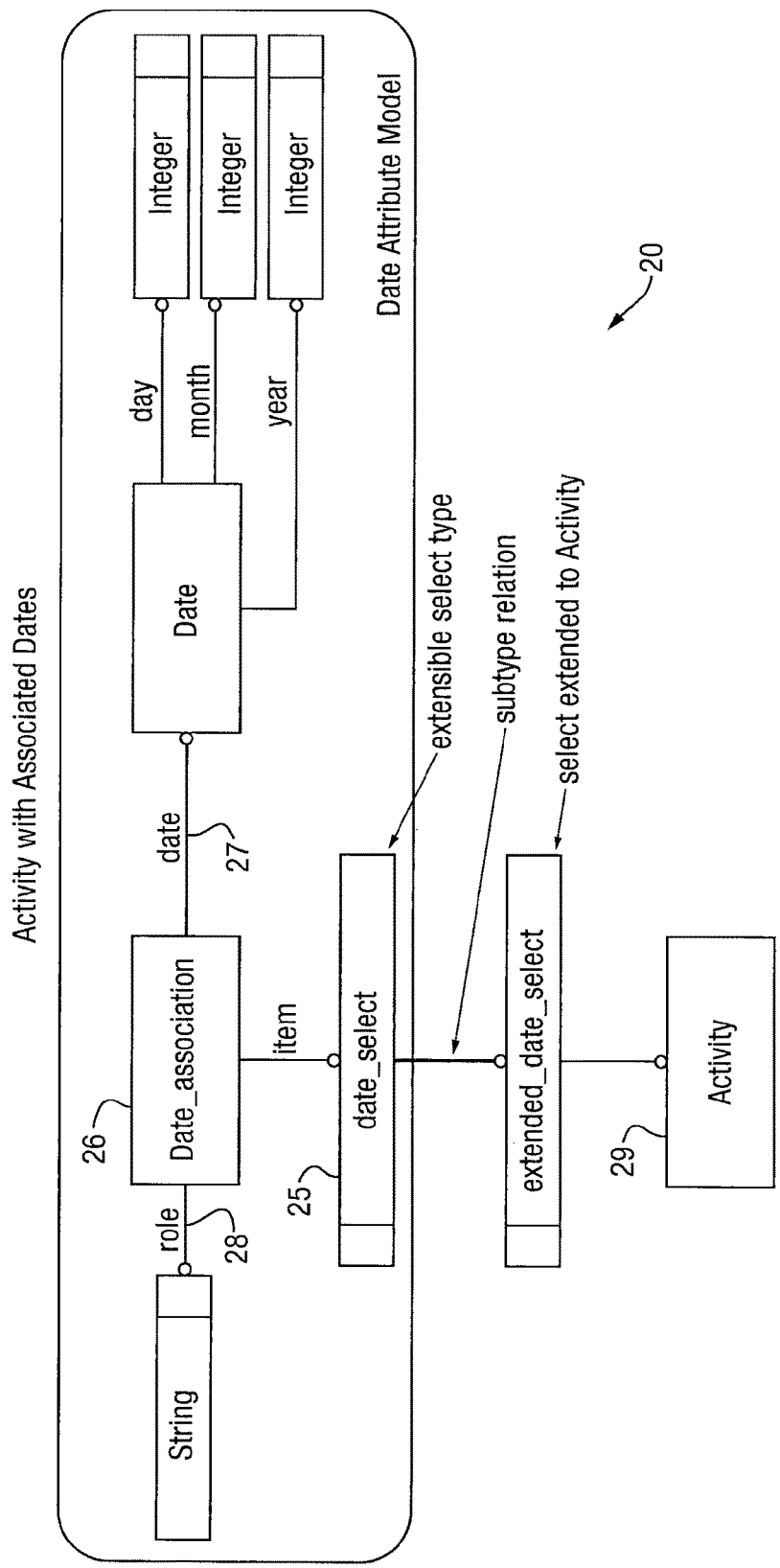
FIG. 2 illustrates schematically a data attribute model that may be used in accordance with an embodiment of the present invention.

The framework data model includes a set of attribute models. FIG. 2 illustrates schematically a particular case attribute model 20 that may be used in accordance with an embodiment of the invention. As shown in the Figure, each attribute model 20 defines a particular data type such as date 27, together with the way it may be associated to the entities of the framework model. In this example, because EXPRESS has strong type restrictions, the association is done by introducing an association entity 26, which then connects through to the target entity 29 through an extensible select type 25 (as shown in FIG. 2). The method by which the association is defined is not part of the invention, and equivalent methods can be used, as demonstrated in the OFFA project. What is essential to this embodiment is that the association must have a role attached to it, so that the role of the attribute can be identified. In the example shown in FIG. 2, this is done by adding the attribute role 28 to the association. This role 28 attribute takes the place of the attribute name in a conventional data model (such as that shown in FIG. 1).

Each attribute model may be seen as a data model fragment, although it may not be possible to express this in some methodologies. For many data types, it is possible to define alternative attribute models, which can instantiate the attribute in different ways. A particular attribute model is referred to as an attribute pattern for the attribute, since to instantiate the attribute, a copy of the pattern is added to the instantiation of the data model used by the system.

Figure 3:
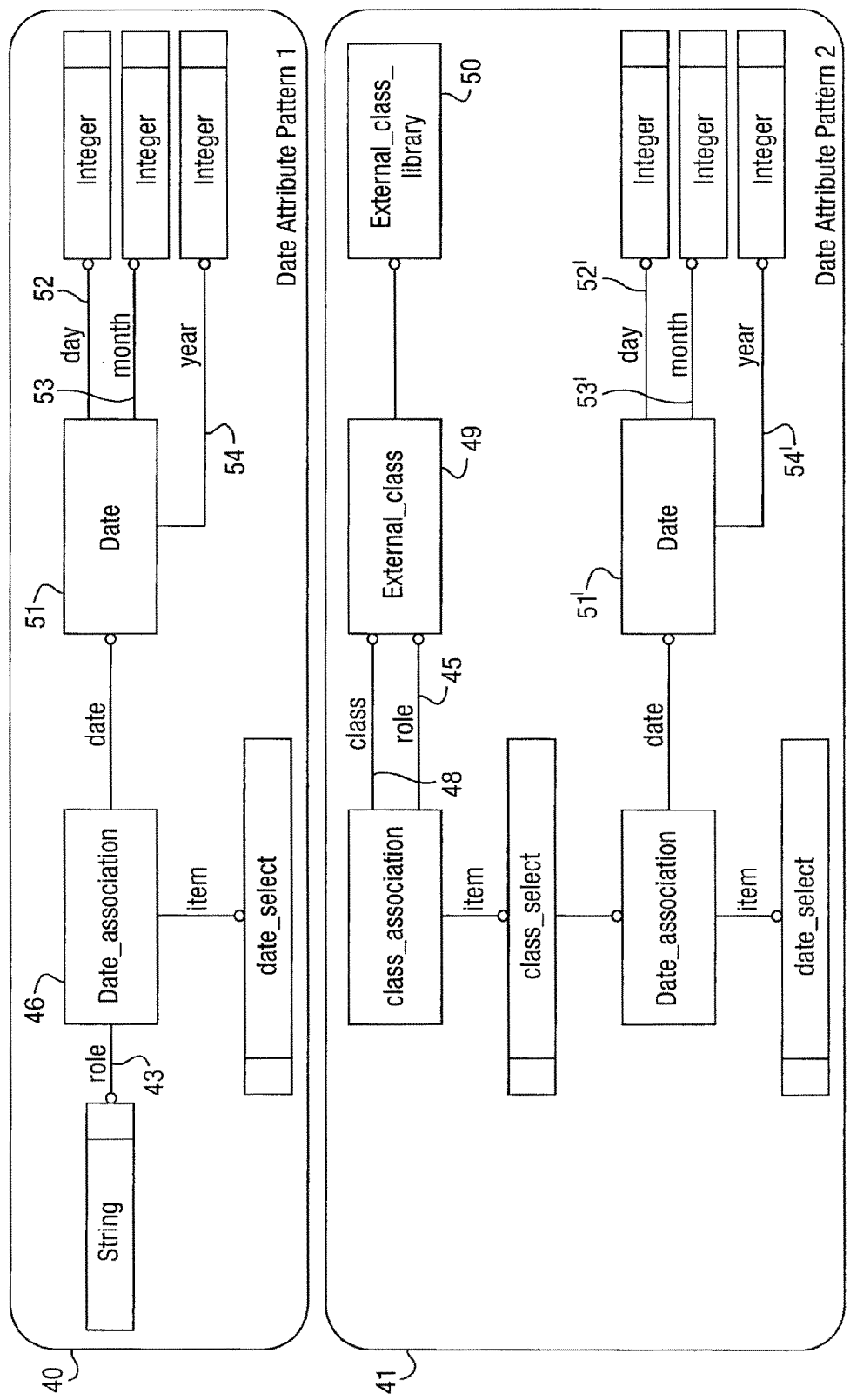
FIG. 3 illustrates schematically two attribute patterns that may be used in accordance with an embodiment of the present invention.

FIG. 3 shows two alternative attribute patterns 40, 41 that may be used in accordance with an embodiment of the invention. As shown in the Figure, the lower pattern (FIG. 3b) replaces the String attribute called role 43 with Class_association.class 48 which is an External_class 49 taken from an external class library 50. As shown, this particular pattern uses an hierarchical class structure, and the Class_association.role 45 is designated a supertype (superclass) of Class_association.class 48. Consequently, from the user viewpoint, the two patterns of FIG. 3 provide exactly the same information. However, from the computational viewpoint, the second pattern (FIG. 3b) provides an explicit representation of the use of a hierarchical classification system to define the role.

Each attribute pattern 40, 41 implies a set of parameters that must be set to instantiate the pattern. For example, to instantiate a Date (51, 51'), values must be set for day (52, 52'), month (53, 53') and year (54, 54'). Alternative patterns are equivalent if the pattern can be instantiated by the same set of parameters, as can the two patterns 40, 41 shown in FIG. 3 (note that the role 43 of Date association 46 in pattern 1, and the class of Class_association 48 in pattern 2 define the role of the attribute, and are therefore not parameters to set the attribute value).

It is to be appreciated that this invention can use equivalent patterns, although in this particular example, the implementation needs to provide the means to transform one pattern into another. The use of a pattern ontology to describe the patterns, and the generation of code—(based on pattern pairs)—to perform this transformation have been demonstrated in the OFFA project.

The invention can conveniently use non-equivalent attribute patterns, that is patterns with different parameter sets. In this case, the implementation needs to provide the means to transform from one pattern to another, and means to deal with the differences in data content. For example, if there is a pattern 3 for date which requires the parameter day_of_week, then the transformation from pattern 1 or 2 could use a calendar to find the day of the week, or it could set the value to "/NULL" to indicate the value is not defined.

Attribute Definition Rules

As will be appreciated, an attribute definition rule is a rule associating an attribute to an entity in a particular role. For example, a rule may require that an Activity will have a Date attribute in the role Start_date, and a second rule may require that an Activity will have a Date attribute in the role of End_date. The role of an attribute is defined by the way it is used in the real world activities that the computer system supports.

As mentioned above, the core of the invention is the ability to define attributes through rules using technical means. In conventional systems such as that of FIG. 1, the data model is fixed and prescribes the list of attributes each entity should have, and these prescriptions are programmed into the model, that is, that they are embedded in the design stage of the life cycle. In the current generation of data standards, notably PLCS, the data model is in part descriptive, in that it defines attributes the data model may have. This is then supplemented by user guidance standards, such as the PLCS Data Exchange Sets (DEX's), which describes the attributes that an entity must have in the given context. Again, it is expected these will be programmed in to the system, and therefore the commitments are made at the design phase of the lifecycle. In the invention, the attributes are defined by rules, and these may be added to or deleted in the operational phase of the system. This eliminates the set up times, and can reduce the time to implement an integration environment from weeks to seconds.

Figure 4:
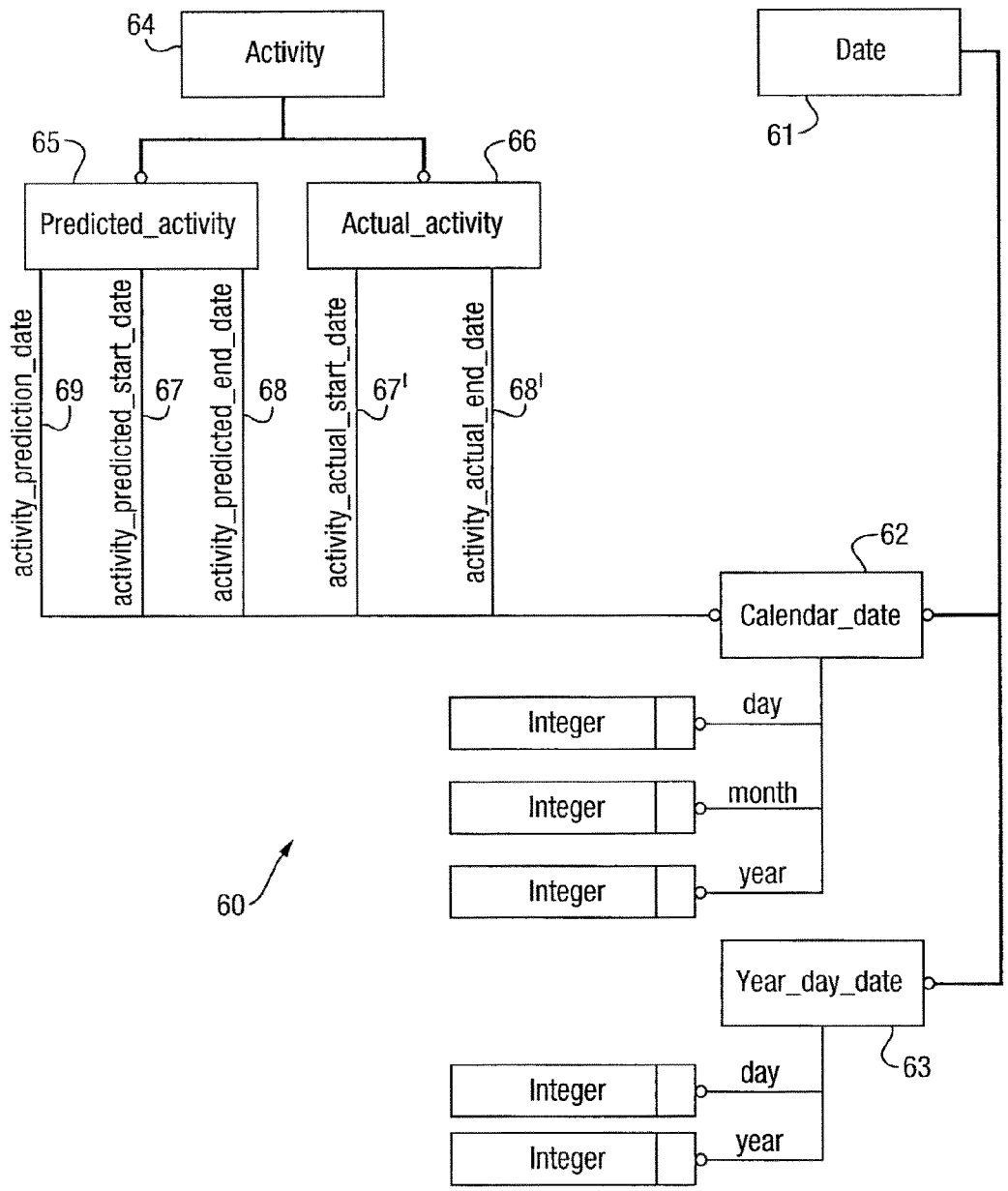
FIG. 4 shows schematically an example of a data model that may be used in accordance with an embodiment of the present invention.

FIG. 4 shows schematically another example of a data model 60 that may be used in accordance with an embodiment of the present invention. Associated with each entity, as shown in the Figure, each attribute type and each role is an element of reference data. The entities and attributes are not subtyped explicitly, but rather the corresponding reference data elements are subtyped, and the actual entity subtype is defined through classification of the entity with the associated reference subtype. For example, corresponding to the entity Activity 64 is a reference data element_activity, which itself has subtypes_predicted_activity and _actual_activity.

The Date attribute 61 also has a set of reference data for different types of date, with _date having the subtypes calendar_date 62 and year_day_date 63 (i.e. the system whereby a date is reference by the day and the year only, such that 6 Feb. 2006 will be recorded as day 37 of 2006 for example) In this illustration, calendar_date 62 and year_day_date 63 are different implementation patterns.

The association of the Date to the Activity also has a set of associated reference data, namely _action_predicted_date, _action_prediction_date (i.e. date when the prediction was made) and _activity_actual_date. Further, _activity_predicted_date and _activity_actual_date both have two additional subtypes for start and end date, i.e. _activity_predicted_start_date 67, etc. which inherit from _start_date and _end_date. Note that the adopted way to structure reference data is a matter of engineering choice, and the invention can use alternative approaches if desired, such as applying two classifications (e.g. actual_date and start_date).

Given the infrastructure of the framework model, the attribute patterns and the reference data, the data model 60 can now be specified in terms of rules, for example:

("PA_has_start", _predicted_activity, _calendar_date, _action_predicted_start_date)67
("PA_has_end", _predicted_activity, _calendar_date, _action_predicted_end_date)68
("PA_has_date_set", _predicted_activity, _calendar_date, _action_predication_date)69
("AA_has_start", _actual_activity, _calendar_date, _action_actual_start_date)67'
("AA_has_end", _actual_activity, _calendar_date, _action_actual_end_date)68'

In this particular example formulation, each rule has four parameters: the rule name (so that the rule can be referenced from other rules), the framework model entity affected, the attribute type to be applied, and the role of the attribute. As noted above, this is equivalent to the schematic data model 60 that may be used in accordance with the embodiment of the invention, as shown in FIG. 4, although the actual implementation does not have the subtypes Actual_activity and Predicted_activity and the date is implemented by a date pattern 40, 41 such as is shown in FIG. 3.

Extended Attribute Definition Rules

The above section described the case of applying a single, required attribute. The invention is not restricted to this, and subsumes extended rules that can express optionality, cardinality, and structure (e.g. lists of attributes, sets of attributes, bags of attributes, etc.). A system embodying the invention must at least be able to define the basic rules described in the preceding section. It should also contain a set of meta-rules (rules about rules) identifying which of the extended attribute definition rules it supports. These meta-rules will also be expressed as a hierarchical system of reference data, which at minimum should include a class for "no extended attribute definition rules". The system should then contain one or more instances from this meta-rule hierarchy, so that it is aware of the system of meta-rules it is using.

Domain Rules and Constraints

A domain rule is one which restricts the value of an attribute. For example, a Date using pattern _calendar_date will restrict the Date.day to a range of 1 to 31, and the Date.month to a range 1 to 12.

A domain constraint will place an additional restriction of the values an attribute may take based on a relationship between attributes. For example, it may be required that a start date precedes an end date.

The system also contain a set of meta-rules identifying which types of domain rule and domain constraint rule it supports. These meta-rules will also be expressed as a hierarchical system of reference data, which at a minimum should include a class for "no domain rules".

Behavioural Rules

A behavioural rule identifies a behaviour applicable to one or more attribute. For example, a -date_difference behaviour will calculate the time period between two dates. A behavioural rule then identifies two entities or entity attributes for which the behaviour is appropriate. For example,
("predicted start to actual start", -date_difference, "PA_has_start", "AA_has_start", _predicted_to_actual)
would define a rule "predicted start to actual start", which uses the date difference behaviour to create information whose meaning is defined by the concept described as _predicted_to_actual. The parameters "PA_has_start" and "AA_has_start" are the names of rules that bind the attributes defined by these rules to the behavioural roles —first_date and —second_date.

The behaviour roles may simply translate as input parameters to subroutines or procedures, to the parameters of service calls, object broker requests and web services, or to the roles defined for inputs to knowledge based systems. The scope of this invention includes the ability to define behavioural rules; however, the design of these rules is determined by the particular systems that use the invention.

The system also contains a set of meta-rules identifying which types of behavioural rule it supports. These meta-rules will also be expressed as a hierarchical system of reference data, which at a minimum should include a class for "no behavioural rules".

SUMMARY

The invention thus uses rules to combine a static framework data model with attribute patterns, using a hierarchical network of reference data both to drive the associations and to define the meaning of the association. This could be expressed by saying the invention makes the data model 'self-aware'.

The invention advantageously allows for extended rules to determine the cardinality, etc. of the attribute, to restrict the domain of the attribute, and to define domain constraints between two or more attributes. It also advantageously allows for the exchange of behavioural rules.

Automatic System Alignment
Aim of Automatic Alignment

The aim of automatic alignment is to allow different organizations to work together using each others' data. There are two significant barriers to this: incompatible data systems and incompatible data semantics. The invention aims to resolve automatically the first problem, and to minimise failures caused by the second.

There are essentially two philosophical views of the semantics of terms. The first has terms being a reification of an abstract idea—a particular green apple is an occurrence of the ideal 'green apple'. The second views terms as a cue to particular behaviours, for example, "get three green apples" may be a cue to a robot shop assistant to get an object from the bin coded "apples", check its colour against a colour chart, and use the count function in the controlling computer to do this three times. This description is couched in terms of the second approach, since this does not require a computer to have abstract ideas.

A system which merely resolves the problem of incompatible data systems at the syntactic level is in danger of misleading the users. For example, if, while attempting to buy fruit, one sends the request for "three green apples" to a computer retailer, the system there may attempt to resolve the request with Macintosh computers.

The meaning of data within a computer system is driven by the behaviour of the overall system—the organization—which the computer system supports. The invention does not try to identify or alter the real world behaviour of the organizations using the computers when it provides data integration. However, by binding the computer system behaviour to a system of hierarchical reference data, and ensuring that the reference data is defined in terms of organizational behaviour, the invention seeks to allow organizations to work together without misunderstanding each others' data.

Uses of Automatic Alignment

Automatic alignment is firstly intended for use in distributed, loosely coupled networks of organizations. These include:

Supply chains, where a supplier may provide goods to many higher tier suppliers, and may acquire goods from several lower tier suppliers. Here, automatic alignment is used to align any particular supply chain through the network, so that all the organizations in the chain can work together. Further, where a supplier participates in many supply chains, these can be integrated so that the supplier needs only a single supporting computer system for all the chains they are members of. It can be assumed that any particular supply chain will last over an extended period, but the network will be constantly changing, with new supply chains being added, and old ones being lost. Consequently, there is never a point where a supplier can upgrade their system without needing to realign it with the rest of the network.

Large scale logistics, where the user organization may have to support a very large number of different systems and products over a long operational life. Examples include airlines, which operate aircraft, provide spares and test equipment to their workshops, buy meals and staff uniforms, etc. Given the diverse nature of the goods procured, each with a separate lifecycle, such an organization will need to deal with many other organizations, each with different rates of change to their supporting computer systems.

Disaster response, where many organizations (police, fire brigade, etc.) each with their own computer systems will need to create an ad hoc organization tailored to the disaster. In this case, a single environment must be rapidly constructed, but need only persist for a relatively short time.

e-business, where the relationship need last only a single transaction, but where there are a vast number of suppliers and procurers, each with their own system, and where the available systems are constantly changing.

Preconditions for Automatic Alignment

Necessary preconditions for automatic alignment using the invention are that the upper levels of the hierarchy of reference data are aligned, both in structure and meaning, and that that the framework data models are aligned.

Without the alignment of the upper levels of the hierarchy of reference data, it would not be possible to find a common starting point for negotiation. Further, unless the meaning of the reference data is aligned, the systems would transfer information which would then be misinterpreted. Note that the reference data also includes the reference data for the meta-rules, and therefore the way the integration environment is engineered is part of the preconditions for alignment. The invention is not dependent on any particular way of engineering the integration environment.

The framework data models need to be aligned, since these are not negotiated, rather they form the agreed starting point for negotiation. The invention is not dependent on any particular framework data model. The framework may be very extensive, as exemplified by ISO 10303-239, or much more condensed, and reference data driven, such as that of ISO 15926. It has been noted elsewhere that, by intensive use of reference data, any system can be reduced to a framework model of three entities, though at the cost of deferring the real data modelling to the reference data, and subsequently producing an obscure model.

Automatic Alignment Environment Architectures

An integrated data environment is intended to be fed with data from the users' systems, and often to feed back data to them. There are essentially three architectural options:

A single integrated data source

Replicated integrated data sources

A virtual integrated data source

Figure 5:
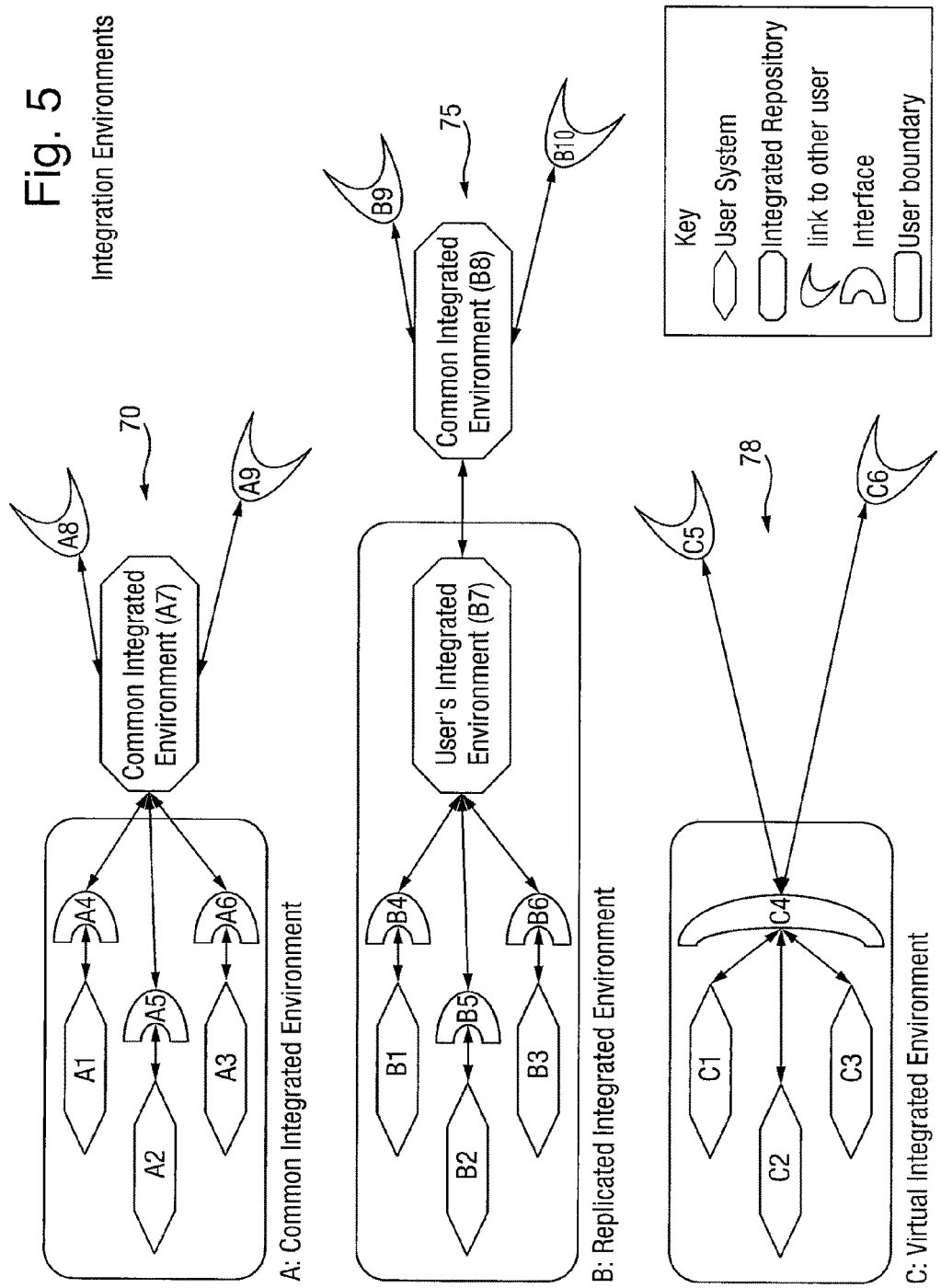
FIG. 5 (a) to (c) illustrate schematically three different architectural options for use with the method of the invention, namely (a) the common integrated environment architecture, (b) the replicated integrated environment architecture, and (c) the virtual integrated environment architecture.

These options 70, 75, 78 are illustrated in FIG. 5. The elements of FIGS. 5 (a)-(c) are:— the user systems which provide the functionality specific to the organization (A1-A3, B1-B3, C1-C3);

the integrated repository, which hold the definition and the data for the integrated environment (A7, B7, B8);

the links to the systems of other organizations (A8, A9, B9, B10, C5, C6); and interfaces from the integrated environment to the user systems (A4-A6, B4-B6, C4).

Note that each of the elements labelled in the Figure can be hosted on its own computer system or several can be hosted together on a single computer system. In the preferred mode of implementation, a system is envisaged to be hosted on the same node as the interface (e.g. A1 with A4).

The user systems may either have their own data repositories, which replicate data, or may be fed directly of the integrated environment. The interfaces transform the data from the structure used in the integrated environment to that used by the user systems. The links to the systems of the other users may use any of the three implementation architectures discussed below.

In the common integrated environment 70 as shown, the user systems access information from a common source A7. Therefore, the common source represents the agreed data for all the users in the integrated environment.

In the replicated integrated environment 75 as shown, the user's data is replicated into the common integrated environment B8 and vice versa. However, the data model of the user's copy need not be the same as that of the common integrated environment. The user's environment may contain additional data needed by the applications, or data with different attribute patterns, or may even be a common store for multiple integrated environments the user organization interfaces with. It is the function of the interface to enact the required transformation.

In the virtual integrated environment 78 as shown, the environment does not provide any storage; this is done in the end user applications. Instead, the interface simulates the effect of the common environment, transforming information and requests for particular behaviours so that the equivalent transactions are provided by the user applications.

The embodiments of the present invention are described in terms of the common integrated environment 70. The use of the replicated and virtual integrated environment do not change the principles of the invention, but do complicate the implementation.

Integration Phase 1—Set the Integration Environment

The first step of data integration is for the using organization to identify the integration environment and the policies that will apply to it. The organization using the system must decide what other organizations they want to work with, with what level of co-operation and trust, and for how long. These decisions form the political or business basis under which the integration environment is established. Illustrations of potential policies are given hereinafter.

The system implementation may impose further limitations. For example, a basic system may only be able to add with single value attributes, while a more advanced one may provide complex attributes with alternate implementation patterns, but no ability to define domain constraints or behaviours.

Integration Phase 2—Reference Data Alignment, Initial substeps

In phase 2 of constructing the integration environment, the various systems link together, and negotiate the detailed definition of the environment. Automated negotiation is the subject of a broad literature, often coupled to the concept of "Agent". The following description illustrates how the parameters of the environment are established; however, as the skilled man in the art will appreciate, the subject of this invention concerns the use of those parameters to define the integration environment.

The first substep of constructing the environment is confirming the participants in the environment, and upper levels of the reference data network. The framework data model, attribute patterns, meta-rules, and various negotiation rules will also need confirmation; however, by naming the elements with reference data, these problems reduce to confirming the reference data.

Confirming the participants is needed for security purposes, to avoid sharing data with unauthorized participants or having data corrupted by unauthorized participants. The security mechanisms are part of the environmental set-up, and are outside the scope of the invention. A second aspect of this is the policies about participants joining or leaving the environment. The choices are between a static environment, in which the data shared is defined on set-up, and a dynamic environment, in which the addition of new participants may modify the environment. From the point of view of this invention, these policies differ in the management rules for the environment, with the dynamic environment requiring more complex rules, and correspondingly more complex software. These policies do not affect the principles of the invention, and only the simpler, static case is described.

Confirming the participants and participation policies is followed by confirming that the participants are using common upper levels to the reference data system. This "upper reference network" is not merely a computer sensible system of terms, it is a set of organizational commitments to respond in particular ways to these terms. Therefore, these terms must have a common point of publication, which must provide detailed, complete, consistent and unambiguous definitions of these terms. Organizations may simply aver that they use the terms correctly, or may be subject to measures up to and including external audits of conformance. The level of confidence in that conformance together with the risk involved with misinterpretation of that information will define the level of trust that participants put in other participants.

Confirming the upper reference network therefore involves confirming the common point of publication. The common point of publication can be anything from a referenced document to a networked service that all the participants access. Note that although each term must have a common point of publication, this does not imply that that every term uses the same point of publication, and the network could be composed from multiple sources. Note also that the common point of publication may be reached through a series of citations, for example the reference network of organization X is derived from the reference network of industrial sector standard Y which is derived from Universal Resource Indicator (URI) Z.

Integration Phase 2—Substeps for Reference Data Alignment

The preceding substep confirmed that the upper reference network comes from a common source. The next substep involves traversing the networks of the individual participants to create a common network for the integrated environment.

As noted earlier, a hierarchal network is either a tree, or the join of several trees. Therefore, every node in the network will be reached by traversing the trees below each of the roots. Confirming the upper reference network is therefore at minimum establishing each of the roots has a common point of publication. Traversal of the network therefore involves traversal of the trees from the roots—there are a number of well known techniques for traversing trees and hierarchical networks, and use of these does not require any innovation. A recursive approach to tree traversal is described below. Tree traversal may lead from one source of publication to another.

Starting with a root node, for a given node the participating systems identify each child node they use, together with its source of publication, and add them to the list of children for the node held in the integrated system. The integration system then collates the responses, and examines whether each system has a particular node, that is, a node of a given name coming from a particular publication source. If every participant uses that child node, that node can be added to the integrated systems set of reference data.

In the case where a node is not used by every participant, the use of the class is determined by the negotiating policies of the participant systems. Policy options include the maximalist policy, in which the system is willing to deal with any class that the other systems require, and the minimalist policy, in which the system will accept only the classes which the system already has. Participant systems may have different policies for descendants of each root. For example, a system may accept additional classes for attribute roles, but refuse classes corresponding to new+ attribute patterns.

Figure 6:
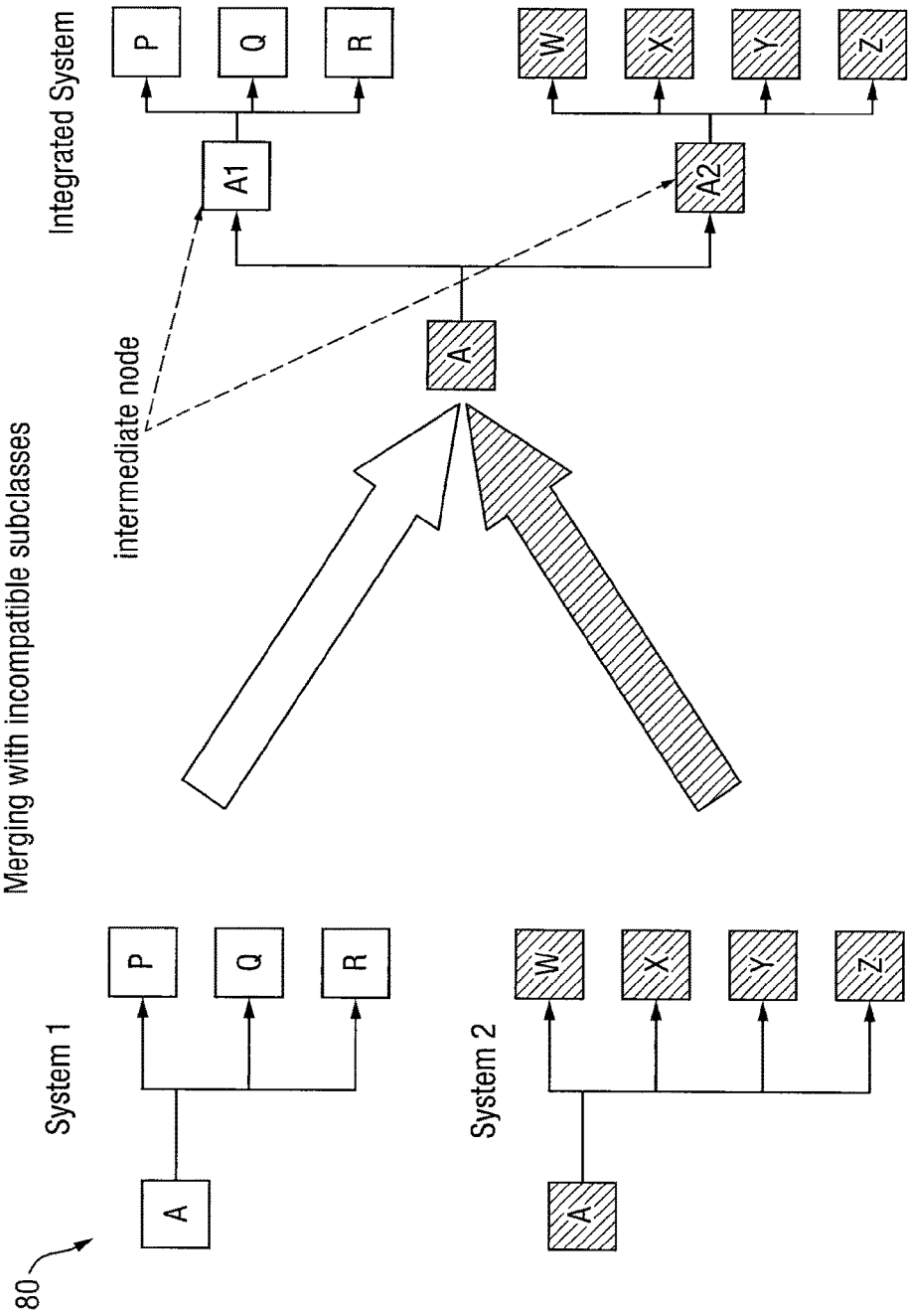
FIG. 6 illustrates schematically the merging of different hierarchies that may be used in accordance with an embodiment of the present invention.

An additional complication is a hierarchy clash as shown in FIG. 6, in which one system uses a different set of children for a node to another—in this Figure, one system uses PQR, while the other uses WXYZ. In this case, some form of conflict resolution is required, such as creating an intermediate node (A1, A2), representing the source of the child. When this is done, the negotiation can continue as before.

Integration Phase 3, Step 1—Attribute Rule Alignment

Given an aligned set of hierarchical reference data, the next step is to align the rule bases. This is done by traversing the reference data nodes corresponding to the entities of the framework data model. One of the potential algorithms for this is to select the root nodes for the trees which correspond to entities in the framework data model, and use these as the start point for tree traversals. An alternative algorithm is to merge the rules bases, sort them by entity type, and then negotiate each rule.

For each node corresponding to an entity type or subtype, the various rule bases are searched to find rules referring to that node, and then the rule can added to the integration rule base depending on the negotiation policies of the environment participants—as before, strategies include the maximalist 'include every rule' and the minimalist 'reject every rule that the system does not have already'. Negotiation strategies will be constrained by the hierarchical reference data network, since any rule for which the reference data is pruned away must itself be pruned away, since it contains a term which is undefined in the pruned reference data network.

The invention lies in the ability to create the integrated data model from the aligned rules.

Integration Phase 3, Step 2—Other Rule Alignments

The final step in defining the integration environment is to negotiate the remaining rules, that is, the domain rules and constraints, and the behavioural rules. The invention does not specify any particular algorithms for doing this.

Integration Phase 3, Step 3—Interface Rule Set

Each system receives the results of the negotiation, and needs to compare the results with its own starting position. It compares the reference data network node by node, flagging nodes as one of:

in both the starting set and the integrated set;
in the starting set only;
in the integrated set only.

It makes a similar comparison for the rule base.

Integration Phase 4—Building the Data Store, Background

This section identifies how the data is constructed for the common integrated environment. The alternative architectures operate in equivalent ways.

Each entity and each attribute pattern have a corresponding structure in the data store. The mapping of the entity or attribute to the data store is embedded in the system code. For example, in a system written in the programming language Java, each entity or attribute pattern would have a corresponding object. Each object has a state, that is, a set values that correspond to the values that need to be recorded. For example, a Date object will have a set of three integers for day, month and year. It will also provide a key to allow the date to be referenced from other entities.

The system then needs to define a persistent storage mechanism for each set of each type of object, for example, it may create a database table for date. A persistence interface method is defined to transfer the object to the persistence store, and another to retrieve it from the store. For example, in the case that the underlying persistence method is a relational database, then the storage method is an SQL command to add the date state elements including the key to the Date table in the database.

Integration Phase 54—Adding Data

To add an entity to the data store, the system adding the data must check the rules it applies to the entity in order to find what data it knows about, and then check the interface rule store to find what data the integrated data environment knows about. The action of the system is best illustrated by way of the following example with reference to FIGS. 7, 8.

Figure 7:
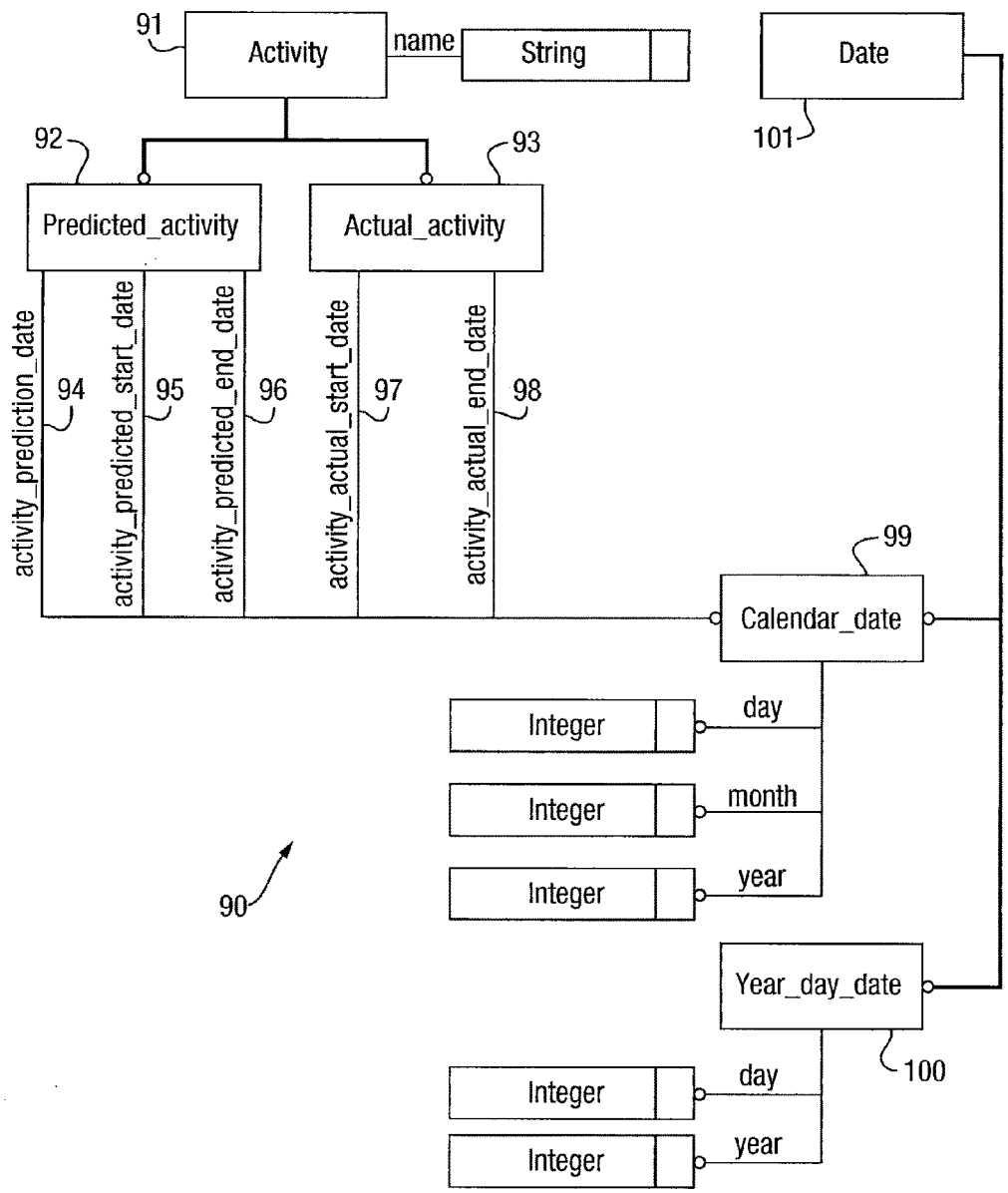
FIGS. 7 and 8 show schematically further examples of data models that may be used in accordance with an embodiment of the present invention.
Figure 8:
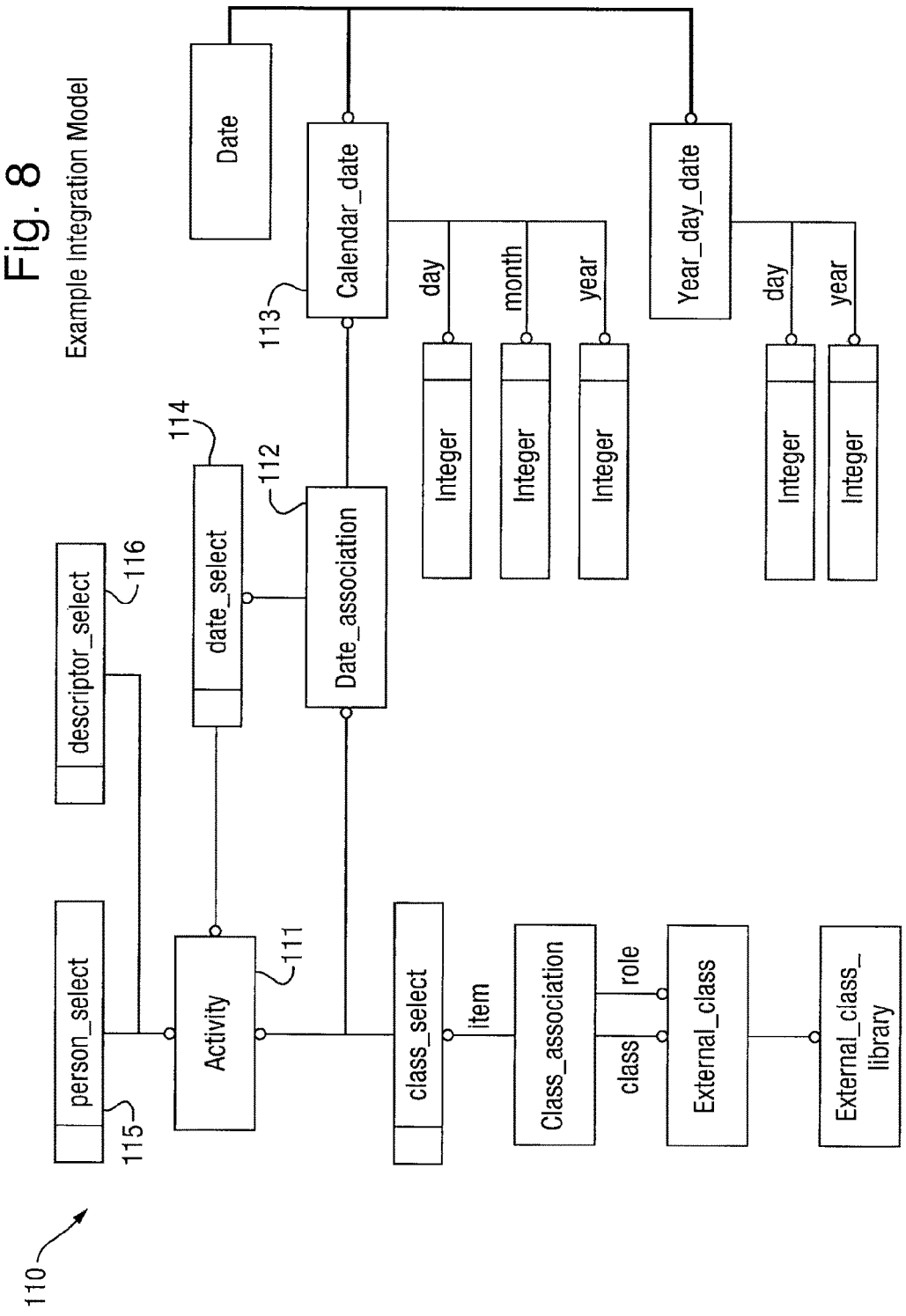

This example concerns the entity Activity, and in particular, its subtype Predicted_activity. The user system applies the attributes predicted_start_date, predicted_end_date and activity_prediction_date. The integration environment does not include activity_prediction_date but does include activity_prediction_person. In this example, the user system creates a copy of a Predicted_activity in the integrated environment. The full data model 90 for the user system is shown in FIG. 7, that for the integrated environment 100 in FIG. 8.

1. The user system is triggered to transfer a particular Activity instance.

2. The user system checks the Classification assignment table for references to the Activity instance—in practice, for efficiency the Activity entity could hold an inverse attribute pointing to each classification.

3. The user system filters the classifications found for classes which are descendants of _activity. In this case, one is found, _predicted_activity, classifying the Activity instance as a Predicted_activity.

4. The user system checks the rule base for attribute rules for Activity and Predicted_activity. It finds the following rules:
   a. Every Activity has a Descriptor in the role of Name;
   b. Every Predicted_activity has a Calendar_date in the role of predicted_start_date;
   c. Every Predicted_activity has a Calendar_date in the role of predicted_end_date; and
   d. Every Predicted_activity has a Calendar_date in the role of activity_prediction_date.

5. The user system then finds the Name instance in the Descriptor table which is linked to the Activity instance in question. It does the same for the three Dates.

6. The user system then checks the interface reference data to see the annotations of the classes _predicted_activity, _descriptor and _calendar_date. Since they are annotated as common to both the user system and the integrated environment, it can transfer the information.

7. The user system then creates an Activity instance in the integrated environment, and classifies this as _predicted_activity. In detail:
   a. The user system invokes the create method for Action which takes the subtype as a parameter.
   b. The integrated environment creates an Activity instance.
   c. The integrated environment creates a Classification assignment instance which links the existing Class object for _predicted_activity to the new instance of Activity. It links the Classification_assignment.role attribute to the Class object Activity (this is an implementation specific detail, used to simplify searches).

8. The user system then adds the attributes for Name, Predicted_start_date, and Predicted_end_date. In detail, for Predicted_start_date (details for the other attributes are similar):
   a. The user system invokes a method to create a Date, specifying the subtype Calendar_date and providing the required state parameters (year, month, day). The integrated environment creates the new Calendar_date instance.
   b. The user system then invokes a method to associate the Activity instance with the Date instance in the integrated environment. In database terms, this could add an entry to a link table containing the database index for the Date instance and the Activity instance, although in practice, for efficiency reasons, this may be done through an entry in the Activity record.

c. The user system then creates a Classification_assignment instance in the integrated environment which classifies the assignment of the Date to the Activity as _predicted_start_date.

9. The integration system then checks for other rules relating to Activity and discovers it requires the attribute activity_predicted_person. Since the attribute is tagged as not existing in the user system, it creates an enquiry to the user system for details of its default person characteristics for an Activity.

10. The user system then finds its default Person definition—since it had the negotiation policy which accepted Person as a potential attribute, it needs the concomitant method to create a default Person as the need arises. This default may distinguish different contexts and create different defaults. The user system then returns the data to the integration system.

11. The integration system then creates the Person instance, and assigns it to the Activity instance in the role of activity_predicted_person.

The essence of this inventive application thus is the use of rules to construct the entity and its attributes, so enabling the list of attributes to be determined at run time. The extended example above shows, in enough detail to construct such a system, how the invention could be constructed in practice. The example embeds various implementation decisions, such as the use of object oriented methods, the order in which things are done and the names of the classes. It is to be appreciated that alternate choices do not materially affect the use of the invention.

Application of Automatic Alignment

The following extended examples further illustrate the use of the invention in particular application areas.

Middle Tier Supplier

Organizational Set-Up

Figure 9:
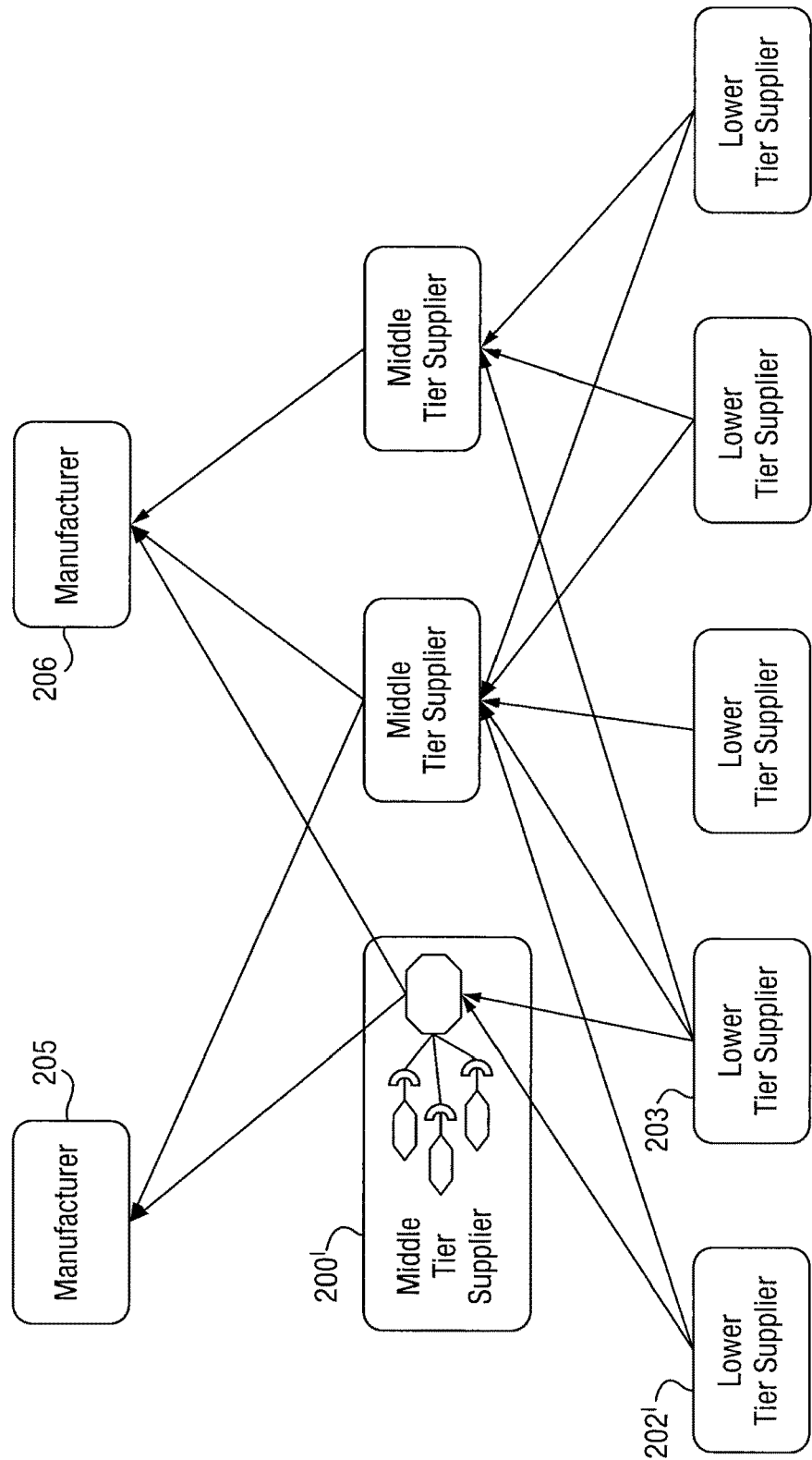
FIG. 9 shows schematically an example of use of the present invention in a supply chain.

FIG. 9 is a schematic diagram which shows a particular example of use of the invention in a supply chain. As shown in the Figure, a middle tier supplier (200' in FIG. 9) is one who buys in components from several lower tier suppliers 202', 203, and uses them to create higher value components for higher tier suppliers or end customers 205, 206. For example, in the car industry, a wheel supplier will buy in strip steel, pressings for the hub, mouldings for the trim, and tyres. They then use specialist machinery to create wheel rims from the strip steel, and assemble rims, hubs trim and tyres into complete wheels ready to be attached to cars on the assembly lines.

To support the movement of materiel from the lower tier suppliers to the middle tier and from the middle tier to its customers, each agent in the system has an electronic orders management system, which sends requests between the tiers. In the Figure, this is represented (201) using the Replicated Integrated Environment architecture described above. Basic to that system are the part type identification codes. The middle tier supplier has part numbers for all the parts they make, as do the suppliers of hubs and wheel trims. The tyre suppliers use stock codes and part codes. A stock code identifies a particular specification of tyre, whereas a part code identifies a particular design of tyre. Each part code is unique, but the same stock code may apply to several designs of tyre, which may differ in tread pattern, reinforcement and price. The steel strip suppliers deal only in stock numbers (identifying the width, thickness and steel specification) and quantities (length of strip supplied).

The car assembly plants assign their own stock numbers to each type of wheel, which the middle tier manufacturer must keep track of. This allows the assembly plant to order from multiple wheel suppliers. Since wheel trim is regarded as an option, an order for wheel will be specified by a wheel stock number together with the wheel trim part number. The middle tier supplier therefore also records any component options specified.

The middle tier supplier is therefore a nexus where several supply lines cross. In practice, some of the lower tiers, such as the steel strip suppliers, will be part of many supply chains, whereas others, such as the wheel trim makers, will feed chains leading to a particular car assembly plant.

So far, this gives the following type hierarchy for the identifier types:

Identifier_code
    part_type_identifier
    stock_number

Associated with each identifier code is the originator or owner of the code, so that the codes carry round with them the context that makes it unique.

The Use of the Invention to Facilitate Change

In this example, a car assembler decides to use a universal catalogue to manage its inventories. The universal catalogue is managed by a specialist cataloguing agency, who, given a specification of a component, either identifies an existing universal catalogue number corresponding to the specification, or allocates a new number. This will allow the manufacturer to identify possible sources of supply when looking for new factory locations.

The car assembler decides to roll out the changes incrementally. Consequently, the car assembler starts by requiring suppliers of distinctive parts to provide universal catalogue numbers as well as part numbers. In the case of the wheels, this applies only to the wheel trim, which is specified as an option.

Consequently, the car assembler and the wheel trim supplier add an addition entry to their identifier type hierarchy:

Identifier_code
    part_type_identifier
    stock_number
    universal_catalogue_number They also add a rule that a part has 0 or 1 universal catalogue numbers.

The result is that the middle tier supplier's system 201 receives a request to renegotiate the interface to the wheel trim supplier and to the car assembler. Since there is a single point of publication, it is assured that the two requests refer to the same definition. It therefore extends its type hierarchy and rule set to include the universal catalogue number. Since the cardinality of the attribute is 0 or 1, its default behaviour is only to record the universal catalogue number when it is supplied as part of an exchange. Note, this policy will subsequently change when the car assembler rolls out the catalogue programme to other suppliers, including the wheel manufacturer.

When receiving an order for wheels from the car assembler, the options element will either be a part_type_identifier or a universal_catalogue_number. The system will then have to create orders for the components. By searching against the appropriate class of identifier code, it can determine whether it knows about the given option, and can place the orders required. It can also use the system to raise enquires on stock levels and work in progress.

Consequences of the Invention

In this example, the middle tier supplier was able to deal with a change to one of the supply chains it operates in without the need to reprogram its systems, and without the need to perturb its other supply chains. This avoids several weeks or months delays in reprogramming, and avoids the necessity for the car assembler to co-ordinate system updates along the whole supply chain. Further, other lower tier suppliers and car assemblers could also add the requirement for universal catalogue numbers without further effort.

The only point at which the middle tier supplier would need to update their system would be when they required additional functionality, such as the ability to add their own universal catalogue number. In this case, they would need to extend their base identifier hierarchy to include universal_catalogue_number, their rule base to include the attribute rule and to write an input dialogue to add the number.

Major End User—A Defense Force

Organizational Set-Up

A defense force maintains a large number of different types of assets, from aeroplanes and ships, through portable bridges and munitions down to clothes and rations for the personnel. The information maintained about them ranges from general information on their size and weight through to operationally important details such as the calibre of munitions or the gauge of a railway wagon. The range of assets is constantly changing, as new equipment is fielded and old equipment taken out of service. Such an organization is also the end-point of many supply chains, each of which has separate historical computer systems, oriented to the industry or even the product. Consequently, the information supplied about the equipment varies enormously, and will change continuously over time.

Further, the uses of the materiel are diverse, including storage, use in training, on-base operations and operations away from base. The IT systems involve inventory management, usage monitoring, shipping, operational planning and operations reporting.

In this situation, it is unlikely that such a major organization could define a single data standard appropriate for all materiel in all uses, and keep the systems using that standard up-to-date using conventional technology.

Consequences of the Invention

In this example, the consequences of the invention are two-fold. Firstly, it can provide an integration interface, for example between the defense force and its suppliers, allowing different standards of interface to be negotiated between the main materiel management systems and the suppliers' systems. Such a system could capture new information as soon as it is made available, and, using pattern transformation techniques, could format all the data in the same way.

The second consequence is that functions from existing systems could be applied to all data in the integration environment, since the function is bound by a rule to a particular subtype.

Rapid Disaster Management Response

Organizational Set-Up

The characteristics of a disaster are the occurrence of an event that overwhelms normal patterns of response. Major recent examples include the Indian Ocean tsunami, terrorist attacks such as those on the World Trade Centre or the London Underground or the meltdown at Chernobyl.

One current requirement is that the various response agencies—police, fire brigade, hospitals, etc.—need to be able to effectively communicate, and increasingly this means to exchange information (see FIG. 10). Note that FIG. 10 is a schematic diagram which shows a particular practical example of the invention in a crisis management situation.

These organizations already maintain IT systems for ordinary operations (Base System BS in FIG. 10), identifying the deployment of police vehicles and officers, the operational readiness of fire stations or availability of medical supplies. Because these are operational systems, these are the primary sources of up-to-date information. Further, these operational systems are constantly being tuned for the organization using them, the organizations select different applications according to their needs, and applications are rolled out on a timetable dictated both by operational and financial constraints. In the case of a disaster, even if a common interface was agreed, it is most unlikely that all the organizations would be running compatible versions of the interface.

Consequences of the Invention

In this example, the function of the invention is to build a useful integration environment based on the interfaces available in a timescale meeting the operational need—that is typically minutes, rather than months.

For example, the various forces will have their own classification of vehicle types for operational units (OU in FIG. 10), such as a fire brigade having the classes fire-tender, foam-tender, ladder-unit or accident-response-unit. Each vehicle type would have its own characteristics, such as radio-type, crew-number or weight. The function of the invention is to provide interoperability between all the systems. In a system using a minimalist policy, these classifications would be trimmed back to fire-brigade-vehicle or even just to vehicle, while in one using a maximalist policy, the detailed classifications would be made available to all users.

Consider now the particular case of a co-ordination system which has as its own baseline the vehicle attribute crew_number and which has a maxamilist policy on vehicle attributes. One of the system's functions is to estimate the number of service personnel in a particular zone—usually the inner cordon for an incident—based on the number of vehicle in or at the edge of the zone. The first stage of the operation is to search for every vehicle in the zone. It then must check each vehicle for a property classified as crew_number. This will be complicated by some source systems reporting no value for the attribute, some providing the attribute, some providing a subclass default_crew_number, some providing the subclass typical_crew_number and some both typical_crew_number and actual_crew_number. Note that the system in question does not understand the subclasses, only the class crew_number.

In this example, the simplistic algorithm searches for any attribute of class crew_number or any of its subclasses, and takes the value of the first one found. In the case of no attribute value found, it uses the default value of 2. The algorithm reports back the total number of crew together with the number of vehicles with no information and the number with a more detailed class. This algorithm is neither sophisticated nor particularly accurate, and, in the case of a vehicle with a typical_crew_number and an actual_crew_number it takes the first value found. However, it provides an estimate within seconds, rather than no estimate, or requires that a human operator check every vehicle and count the crew manually, which would typically take minutes.

Internet Commerce

Organization Set-Up

One objective of business-to-business internet commerce is to rapidly match buyers with sellers. Some of the advantage of this is lost if one then has to manually enter the transaction data into each of the buying and selling systems. Information interchanged will include the names and addresses of the buyers and sellers, the goods ordered, the payment details, and the terms and conditions of the transaction. While it is possible to do this automatically with a common XML schema, the chances of two organizations using identical schemas is currently low.

Consequences of the Invention

In this particular example, the inventive application separates out three separate concepts—the fundamental entities to be exchanged, the (abstract) attributes of an entity and the implementation pattern for the attributes.

In the negotiation process, the two parties proceed by comparing the entities each of their systems have in common, and identifying whether they have sufficient entities in common to proceed automatically, or whether the subtypes they are using can fulfil the transaction. The use of a common point of publication ensures that the entities mean the same thing to each organization. If there is no commonality, the transaction would need to be processed manually.

In the second stage, the parties check that the appropriate attributes are available for exchange. Again, if the attributes are not available, then the transaction reverts to manual input.

At the third stage, the parties compare implementation patterns for each attribute. If the patterns are identical then the transaction can proceed, if not, the parties need to find an appropriate pattern transformation, either from their own resources or as a service on the Web. This may, for instance, take the form of the XSL need to transform the XML output by one system into that needed by the other.

The consequence of the invention therefore is that it is able to build rapidly an ad hoc interface between the two systems involved in the transaction, provided they have the same basic starting point. It does not require them to have identical interfaces (note that the OFFA experiments, as cited previously, could automatically generate interfaces between some thirty different implementations of a single entity/attribute combination—an indicator of the scope for diversity between systems).

Whilst the invention has been described above, it extends to any inventive combination of the features set out above and/or in the following. Although illustrative embodiments of the invention are described in detail herein with reference to the accompanying drawings, it is to be understood that the invention is not limited to those precise embodiments. As such, many modifications and variations will be apparent to practitioners skilled in this art. Furthermore, it is contemplated that a particular feature described either individually or as part of an embodiment can be combined with other individually described features, or parts of other embodiments, even if the other features and embodiments make no mention of the particular feature. Thus the invention extends to such specific combinations not already described.

ABBREVIATIONS

CAD Computer Aided Design
EER Enhanced Entity Relationship (modelling technique)
OWL Web Ontology Language (a W3C standard)
PLCS Product Life Cycle Support, ISO 10303-239
STEP Standard for the Exchange of Product Model Data
SQL Structured Query Language (ANSI/ISO standard)
UAV Uninhabited Autonomous Vehicle
URI Universal Resource Indicator
UML Universal Modelling Language (ISO/IEC 19501)
XML eXtensible Markup Language (a W3C standard)
XSL eXtensible Stylesheet Language (a W3C standard)

The invention claimed is:

1. In a collection of enterprises which uses a data communication systems network comprising a plurality of disparate data communication systems, a method of building a data integration environment, the method comprising the steps of:
 (a) establishing a predetermined set of rules about data based upon a data framework, a set of hierarchical classification (or ontology) rules and attribute rules for each disparate data communication system of the network;
 (b) replicating at least one set of rules representative of one of the systems and transferring said replicated set of rules to one or more other said systems of the network;
 (c) negotiating, based on processing capabilities of the systems to and from which the at least one set of rules were replicated, a common rules set between the integration environment and the systems, by merging the rules about the data associated with the systems;
 (d) loading the merged rules into the integration environment rule base and selectively populating the datastore implementing the data integration environment with rules data from each of the systems; and
 (e) effecting data exchange between each of said systems and the integration environment in accordance with the newly-established rule set so as to allow the disparate systems to interoperate with each other.

2. A method of building a data integration environment as claimed in claim 1, including a step of linking the attribute rules to the hierarchical classification rules in such a way as to permit the set of rules to be used to define the meaning of attributes, the form of attributes and/or the use of attributes.

3. A method of building a data integration environment as claimed in claim 2, wherein the hierarchical classification rules are used by means of their hierarchical structure to define the meaning of attribute rules particular to one or more of said systems, which attribute rules describe attribute types, attribute values and/or a combination of attribute types and attribute values.

4. A method of building a data integration environment as claimed in claim 3, wherein the hierarchical classification rules are used by means of their hierarchical structure to define the meaning of behaviour rules particular to one or more of said systems, which behaviour rules are used with the attribute types, the attribute values and/or a combination of the attribute types and the attribute values.

5. A method of building a data integration environment as claimed in claim 1, wherein the hierarchical classification rules are used by means of their hierarchical structure to define the meaning of attribute rules particular to one or more of said systems, which attribute rules describe attribute types, attribute values and/or a combination of attribute types and attribute values.

6. A method of building a data integration environment as claimed in claim 5, wherein the hierarchical classification rules are used by means of their hierarchical structure to define the meaning of behaviour rules particular to one or more of said systems, which behaviour rules are used with the attribute types, the attribute values and/or a combination of the attribute types and the attribute values.

7. A computer program comprising program code means stored on a non-transitory computer readable medium for performing the method steps of claim 1 when the program is run on a computer.

8. A computer program product comprising program code means stored on a non-transitory computer readable medium for performing the method steps of claim 1 when the program is run on a computer.

9. A method as claimed in claim 1 applied in a UAV network.

10. A method as claimed in claim 1 applied in a robot network.

11. A method as claimed in claim 1 applied in a network of fixed sensors.

12. A method of building an agile data model comprising the steps of:

(a) establishing a framework data model representation of a set of states, each one of the states being associated with a concept variable describing the model;

(b) establishing a set of states corresponding to attributes and attribute roles which are applicable to the model;

(c) defining a hierarchical classification of states corresponding to the concept variables of (a), the attributes and the attribute roles; and (d) constructing said data model based upon the established set of states of aforesaid steps (a), (b) and (c), and by creating therefrom a set of rules which associate particular attributes to particular framework concepts in particular attribute roles.

* * * * *